United States Patent Office 3,349,077
Patented Oct. 24, 1967

3,349,077
ETHERIFIED XANTHOMONAS HYDROPHILIC COLLOIDS AND PROCESS OF PREPARATION
Richard G. Schweiger, San Diego, Calif., assignor to Kelco Company, San Diego, Calif., a corporation of Delaware
No Drawing. Filed May 17, 1965, Ser. No. 456,467
12 Claims. (Cl. 260—209)

This application is a continuation-in-part of my application entitled Treatment of Xanthomonas Hydrophilic Colloids filed June 26, 1963, Ser. No. 290,580 and now abandoned.

This invention relates to methods of improving the compatibility of Xanthomonas hydrophilic colloid with organic solvents, and more particularly to the treatment of said colloid to that end with certain epoxy compounds.

Xanthomonas hydrophilic colloid is a biosynthetic polysaccharide composed of glucose, mannose, and glucuronic acid in the molar ratio 2:1:1, with approximately each ¼ unit of the polymer containing one acetyl group. While it disperses or dissolves in water to give solutions of greatly increased viscosity, being in that respect similar to some other natural gums, its properties are not ideal for all applications, and in particular, it has very poor compatibility with organic solvents, particularly alcohols. Thus, it can be scarcely used with cosmetic or pharmaceutical formulations including such simple alcohols as ethanol and isopropanol. Again it is generally unsuited as a thickener in hydraulic fluids which contain substantial amounts of alcohols, glycols, and the like.

An object of the present invention is to improve the properties of Xanthomonas hydrophilic coloid so that it is converted to a product which is compatible with simple alcohols.

Another object of the invention is to provide a method for obtaining hydroxy alkyl ethers of Xanthomonas hydrophilic colloid, and indeed to provide the reaction product itself.

Other objects of the invention will become apparent as the description thereof proceeds.

As a starting material, I employ Xanthomonas hydrophilic colloid. A Xanthomonas hydrophilic colloid that is particularly suitable for use in accordance with my invention is such a colloid prepared by the bacterium *Xanthomonas campestris*. The said colloid is a polymer containing mannose, glucose and potassium glucuronate. In such a colloid, the potassium portion can be replaced by several other cations without substantial change in the property of the said material for my purpose. The said colloid, which is a high molecular weight, exocellular material, may be prepared by the bacterium *Xanthomonas campestris*, by whole culture fermentation of a medium containing 2 to 5 percent commercial glucose, organic nitrogen source, dipotassium hydrogen phosphate and appropriate trace elements. The incubation time of the final medium is approximately 96 hours at 30° C. aerobic conditions. In preparing the colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage the reaction may be permitted to continue for 24 hours under the same conditions as the first stage. The culture so acclimated for use with glucose by the aforementioned first and second stages is then added to the final glucose medium. In the aforesaid method of preparing *Xanthomonas campestris* hydrophilic colloid, a loopful of organism from the agar slant is adequate for the first stage comprising 200 milliliters of the said glucose medium. In the second stage the material resulting from the first stage may be used together with 9 times its volume of a 3% glucose medium. In the final stage the material produced in the second stage may be admixed with 19 times its volume of the final medium. A good final medium may contain 3% glucose, 0.5% distillers' dry solubles, 0.5% dipotassium phosphate, 0.1% magnesium sulphate having 7 molecules of water of crystallization and water. The reaction in the final stage may be satisfactorily carried out for 96 hours at 30° C. with vigorous agitation and aeration. The resulting *Xanthomonas campestris* colloidal material which I have found to be suitable for my purpose can be recovered and sterilized by precipitation in methanol of the clarified mixture from the fermentation.

In accordance with an illustrative embodiment of my invention, the reaction may be carried out by first preparing the alkali polysaccharide by mixing thoroughly an aqueous solution containing 10 to 40% by weight of sodium hydroxide of the weight of the Xanthomonas hydrophilic colloid so treated. The aqueous solution should preferentially contain a lower alcohol such as methanol, ethanol, propanol, isopropanol to inhibit partial dissolution of the colloid by the said aqueous solution. The alcohol in the aqueous medium should preferably be in the range of 20 to 80% by weight of the weight of the water and alcohol in said aqueous medium. It may be noted that some of the sodium hydroxide is consumed for deacetylation. The alcohol and/or part of the water is next removed by heating in the presence of an air stream to a water content of between 10 to 40%. The resulting mixture is then reacted in a pressure-reaction chamber (with stirring) with 200–300 cc. of propylene oxide, or an alkylene oxide in the range of 35–60° C. and preferably in the range of 40–50° C. This portion of propylene oxide usually is enough to obtain a high substitution. If less propylene oxide is used, the D.S. will be correspondingly lower. The amount of alkylene oxide employed for the purpose of my invention may range from 30 to 150% by weight of the weight of the initial Xanthomonas hydrophilic colloid to be so treated.

The degree of substitution is also affected by the time and temperature of the reaction. The reaction may be carried out in the range of 8 to 2 hours, depending on the temperature selected and the degree of substitution desired. A preferred time range is 5 to 4 hours.

Much higher proportions of sodium hydroxide and considerably higher temperatures than indicated above should be avoided if an undegraded product is desired. A degradation usually is indicated by a low viscosity of a solution of the product. This, however, does not mean that a low viscosity material is not useful; even with a low viscosity product, for example, thin alcoholic gels can be obtained.

In order to obtain the improved colloid in accordance with my invention, I am not limited to the alkylene oxide mentioned in the foregoing, but in general I may use any of the following: epoxyethane; epoxypropane; 1,2-, or 2,3-epoxybutane; epoxyisobutane; epoxy 3 butene and epoxy propanol.

Generally speaking, and as may be noted from the foregoing, the reaction with the alkylene oxide takes place in an alkaline medium, which functions as a catalyst and also determines the type of condensation taking place. The alkaline medium may be provided by sodium hydroxide together with water and a lower alcohol such as methanol, ethanol, propanol, isopropanol, and the like, the said alcohol preferably being removed before the reaction with the alkylene oxide is started. The sodium hydroxide may be replaced with known equivalents such as potassium hydroxide, lithium hydroxide, and the like. In view of the necesity of an elevated temperature, preferably in the range of 40 to 50° C. and of the volatility and indeed in some cases the gaseous form of the alkylene oxide, it is necessary to use a closed vessel to carry out the etherification with the alkylene oxide. After the etherification is substantially complete, the resulting treated colloid is washed with an organic solvent which will remove the alkali used, but will not cause the treated colloid to swell to an appreciable extent as this would slow down the recovery process. Methanol, ethanol, propanol, isopropyl alcohol and acetone are suitable, per se, for this purpose or mixed with water up to about 20%.

Some specific examples will now be given of the procedure in accordance with my invention.

*Example I*

200 g. of *Xanthomonas campestris* hydrophilic colloid obtained as aforesaid was mixed with a solution of 80 g. of sodium hydroxide in 80 cc. of water and 110 cc. of methanol. Then it was dried to a weight of 330 g., placed in a Pfaudler pressure reaction apparatus and heated to 45 to 50° C. 200 cc. of propylene oxide was added over a period of about 5 hr., the total reaction time being 8 hr. The reaction product was washed with 95% and then with pure methanol to the last portion of which some acetic acid was added. Then it was extracted for 24 hr. with 90% methanol in a Soxhlet extractor; viscosity 27.5 cps.; D.S. 0.25.

For the calculation of the D.S. in the above example and in the examples to follow, end methyl determinations were made as described by R. Kuhn and H. Roth, Ber., 66, 1274 (1933). The procedure assentially consists of an oxidation with chromic acid in sulfuric acid. The acetic acid formed is distilled off and titrated with 0.1 N sodium hydroxide and is indicative of the number of end methyl groups in the product. The values used for the calculation of the D.S.'s were obtained by subtraction of the value of a blank (unsubstituted Kelzan) from that of the derivative to be determined. The calculation of the D.S. was based on an average unit weight of 200.

*Example II*

200 g. of Xanthomonas hydrophilic colloid was mixed with 30 g. of sodium hydroxide, dissolved in a mixture of 30 cc. of water and 150 cc. of methanol. It was dried to 251 g. and then reacted over a period of 5 hr. at 43° C. using 200 cc. of propylene oxide. The reaction product was washed with methanol, neutralized as a suspension in methanol with acetic acid, extracted with 90% methanol in a Soxhlet extractor and dried at 40° C. in the presence of an air stream; viscosity 646 cps.; D.S. 0.2.

*Example III*

200 g. of Xanthomonas colloid was mixed with a solution of 40 g. of sodium hydroxide in 100 cc. of water and 50 cc. of methanol and then dried to a weight of 330 g. The reaction was carried out at 50° C. All other conditions were the same as described above. Because the reaction product swelled in methanol, isopropyl alcohol was used for washing. The product was extracted in a Soxhlet extractor with isopropyl alcohol; viscosity 16 cps.; D.S. 0.9.

*Example IV*

300 g. of Xanthomonas colloid as above was mixed with 30 g. of sodium hydroxide, dissolved in 120 cc. of water and 80 cc. of methanol and then dried to 420 g. The reaction was carried out at 50° C.; 300 cc. of propylene oxide was added over a period of 3 hr., the total reaction time being 5 hr. Only part of the propylene oxide seemed to be consumed. The reaction product was washed with methanol, neutralized and extracted with pure methanol in a Soxhlet extractor for 24 hr.; viscosity 113 cps.; D.S. 0.35.

*Example V*

300 g. of Xanthomonas colloid was mixed with a solution of 40 g. of sodium hydroxide in 120 cc. of water and 200 cc. of methanol and then dried to 464 g. This product was reacted at 40 to 45° C. with 200 cc. of propylene oxide over a period of 5 hr. The reaction product was washed with methanol, neutralized with acetic acid, extracted in a Soxhlet extractor with methanol for 40 hr. and dried at 45° C. in the presence of an air stream; viscosity 138 cps.; D.S. 0.3.

The new derivatives prepared in accordance with my invention have utility in a range of D.S. from .1 to 1.

Due to its compatibility with alcohols this new derivative is useful in the cosmetic field as a thickener or stabilizer.

An example showing the utility of my improved product in the hair dressing art is the following formulation for a wave set lotion. To 30 cc. of ethyl alcohol and 70 cc. of distilled water there is added one gram of the product obtained in accordance with Example I hereinabove. The suspension thus obtained is an excellent hair set lotion to be applied with a comb in the usual fashion. It may be lightly tinted green with a suitable dye and scented with a suitable perfume.

The Xanthomonas colloid that has been used in the foregoing to illustrate derivatives thereof in accordance with my invention as aforementioned is that produced by the bacterium *Xanthomonas campestris*.

While *Xanthomonas campestris* is the bacterium of choice, and the colloid of which I have found to be best, nevertheless related species of *Xanthomonas* also elaborate a hydrophilic colloid which may be utilized with almost equal success in many instances. Such other species are *Xanthomonas begoniae, Xanthomonas malvacearum, Xanthomonas carotae, Xanthomonas incanae, Xanthomonas phaseoli, Xanthomonas vesicatoria, Xanthomonas papavericola, Xanthomonas translucens, Xanthomonas vasculorum, Xanthomonas hederae,* and others. These are all included in the scope of my invention.

It will be appreciated that while I have described my invention in terms of specific ingredients, reaction conditions and the like, numerous variations may be made in the details thereof without departing from the spirit and scope of the invention as delineated in the claims which follow.

I claim:

1. The process of treating a Xanthomonas hydrophilic colloid to increase its compatibility with an organic solvent which comprises the steps of: contacting said colloid with 10 to 40% of the weight thereof with an alkali hydroxide dissolved in an aqueous medium, placing the colloid so treated with said alkali hydroxide in a closed vessel, heating said treated colloid to a temperature in the range of about 35° C. to 60° C., introducing from 30 to 150% by weight of the initial weight of the Xanthomonas colloid of an alkylene oxide selected from the group consisting of epoxyethane, epoxypropane, 1,2-epoxybutane, 2,3-epoxybutane, epoxyisobutane, 1,2 epoxy 3 butene and epoxy propanol into said vessel while maintaining said temperature and continuing the said treatment step until said colloid is etherified by the said alkylene oxide to a D.S. in the range of from 0.1 to 1.0.

2. The process of claim 1 in which the water content of the colloid and alkali hydroxide mixture is adjusted within the range of about 10 to about 40% by weight prior to the treatment of the said mixture in the said closed vessel.

3. The process of claim 1 in which the said Xanthomonas colloid is contacted with an aqueous alkali hydroxide medium containing a lower alcohol selected from the group consisting of methanol, ethanol, propanol and isopropanol in an amount of about 20 to 80% by weight of the weight of the water and alcohol in said aqueous medium.

4. The process of claim 1 in which the treating step with the alkylene oxide is carried out for a time in the range of 8 to 2 hours.

5. The process in accordance with claim 1 in which the temperature range is in the range of 40 to 50° C.

6. The process of claim 1 in which the alkali hydroxide is selected from the class consisting of sodium and potassium hydroxide.

7. The process of claim 1 in which the product resulting from the said etherification step is washed with an organic solvent selected from the group consisting of methanol, ethanol, propanol, isopropanol and acetone to remove alkali hydroxide from the said resulting etherified product.

8. An etherified Xanthomonas hydrophilic colloid having a D.S. of .1 to 1, with a hydroxyalkyl radical selected from the group consisting of hydroxyethyl, hydroxypropyl, hydroxybutyl, hydroxyisobutyl, hydroxy 3 butenyl and dihydroxypropyl.

9. A hydroxyethyl *Xanthomonas campestris* hydrophilic colloid having a D.S. in the range of .1 to 1.

10. A hydroxypropyl *Xanthomonas campestris* hydrophilic colloid having a D.S. in the range of .1 to 1.

11. A hydroxybutyl *Xanthomonas campestris* hydrophilic colloid having a D.S. in the range of .1 to 1.

12. A hydroxyisobutyl *Xanthomonas campestris* hydrophilic colloid having a D.S. in the range of .1 to 1.

References Cited
UNITED STATES PATENTS

| | | | |
|---|---|---|---|
| 2,688,598 | 9/1954 | McNeely | 260—209 |
| 2,845,417 | 7/1958 | Kesler et al. | 260—209 |
| 2,900,268 | 8/1959 | Rankin et al. | 260—209 |
| 3,020,206 | 2/1962 | Patton et al. | 260—209 |

LEWIS GOTTS, *Primary Examiner.*

J. R. BROWN, *Assistant Examiner.*